United States Patent [19]

Benfer et al.

[11] Patent Number: 4,733,458

[45] Date of Patent: Mar. 29, 1988

[54] BAYONET COUPLING FOR AXIALLY MOUNTING A RING-SHAPED MEMBER ON A SHAFT STUB

[75] Inventors: Ernst-Oskar Benfer, Bad Laasphe; Gerd Irle, Hilchenbach, both of Fed. Rep. of Germany

[73] Assignee: SMS Schloemann-Siemag Aktiengesellschaft, Dusseldorf, Fed. Rep. of Germany

[21] Appl. No.: 18,219

[22] Filed: Feb. 24, 1987

[30] Foreign Application Priority Data

Feb. 21, 1986 [DE] Fed. Rep. of Germany ....... 3605615

[51] Int. Cl.⁴ .......................................... B21D 53/10
[52] U.S. Cl. ........................................ 29/724; 29/110; 29/282; 29/426.5
[58] Field of Search .............. 29/244, 252, 282, 426.1, 29/426.5, 700, 724, 110

[56] References Cited

U.S. PATENT DOCUMENTS

| 3,383,755 | 5/1968 | Chmielewski | 29/724 X |
| 3,627,388 | 12/1971 | Jennings | 384/99 |
| 4,542,571 | 9/1985 | Sullivan | 29/724 X |
| 4,694,569 | 9/1987 | Colvell et al. | 29/724 |

FOREIGN PATENT DOCUMENTS

| 873614 | 6/1971 | Canada | 29/724 |
| 87895 | 9/1983 | European Pat. Off. | 29/724 |
| 2606648 | 8/1977 | Fed. Rep. of Germany | 29/724 |

*Primary Examiner*—Howard N. Goldberg
*Assistant Examiner*—Ronald S. Wallace
*Attorney, Agent, or Firm*—Karl F. Ross; Herbert Dubno

[57] ABSTRACT

A circular groove present on a journal on its end is utilized to provide a bayonet coupling on the journal without mechanical refinishing work to fix or clamp a ring piece axially on the journal. The clamped supporting elements of the bayonet coupling are formed as a divided supporting ring whose collar engages in the circular groove and is rigidly nonrotatably held in it. The circumferentially divided supporting surfaces of the supporting ring are assembled by attaching members correspond in the locked configuration with the interiorly directed circumferentially divided abutting surfaces of the clamped ring piece which form the rotatable portion of the bayonet coupling.

6 Claims, 2 Drawing Figures 4,733,458

BAYONET COUPLING FOR AXIALLY MOUNTING A RING-SHAPED MEMBER ON A SHAFT STUB

FIELD OF THE INVENTION

Our present invention relates to a bayonet coupling for axially mounting a ring-shaped member on a shaft stub and, more particularly, to a bayonet coupling for attaching an inner cylinder of a hydraulic bearing extractor to a shaft stub, e.g., the journaled shaft end of a rolling-mill roll.

BACKGROUND OF THE INVENTION

To prepare a shaft stub to anchor a bayonet coupling to it, it has been required up to now to provide the shaft stub with a circular groove and to machine the stub end projecting therebeyond with circumferentially spaced openings to be able to push on the rotatable portion of the bayonet coupling, the bayonet ring, up to the circular groove.

By rotation of the bayonet ring, the ring member on the shaft stubs is axially clamped and/or is braced against an abutment.

When, however, shaft stubs are used which only have one circular groove and whose stub end projecting beyond the groove is a closed collar, it is required to machine the circumferentially divided openings in this closed collar.

This machining operation is, for example, required for the shaft stub used in a journal bearing assembly with a hydraulic bearing extractor according to U.S. Pat. No. 3,627,388 in which a circular groove at the end of the shaft stub receives a divided clamping ring. If a shaft stub bearing with a bayonet coupling instead of the divided clamping ring is desired, the roll must be subjected to the costly machining operation at the shaft stub end as described.

OBJECTS OF THE INVENTION

It is an object of our invention to provide an improved bayonet coupling, e.g., for a shaft stub of a mill roll to hold the inner cylinder of a bearing extractor in place and which will obviate the drawbacks hitherto encountered.

It is also an object of our invention to simplify the mounting of a bayonet coupling on a stub shaft.

It is another object of our invention to provide a bayonet coupling for mounting a ring member on a stub shaft having a circumferential groove, without the machining heretofore required.

SUMMARY OF THE INVENTION

These objects and others which will become more readily apparent hereinafter are attained in accordance with our invention using a shaft stub having a circular groove and which is provided with a bayonet coupling for axially fixing a ring member on the shaft stub, especially for fixing the inner cylinder of a hydraulic extractor for a roller bearing on the shaft stub.

According to our invention a support ring, forming one of the two mutually interfitting members on the bayonet coupling and provided with a plurality of alternating angularly equispaced openings and supporting surfaces, is constituted of two supporting ring halves attachable by fastening elements which have inner collar halves which engage in the circular groove of the shaft stub.

At least one of the supporting ring halves is rendered nonrotatabe with respect to the shaft by being rotationally secured with the shaft stub.

A ring member is provided with a corresponding number of alternating circumferentially divided (i.e., angular equispaced) passages and abutting surfaces (interfitting respectively with the supporting surfaces and openings of the support ring) to form the rotatable portion of the bayonet coupling.

Thus the assembled nonrotatable and axially fixed supporting ring in the circular groove substitutes for the end of the shaft stub machined with openings and of the so called "clover leaf shape" of the earlier designs. While this shaft stub end according to the objects set forth should have a closed collar, the supporting ring because of its separability can be readily mounted in the continuous circular groove formed by the collar.

To complete the bayonet coupling it is only required to slide the ring member (i.e., the inner cylinder of the hydraulic bearing extractor) which is to be axially fixed on the shaft stub and has the corresponding interiorly directed circumference dividing alternating abutting surfaces and passages, over the mounted supporting ring and fix it in the sense of a bayonet coupling by rotation of this outer ring namely relative to the axially and rotationally fixed support ring.

The dividing planes of the assembled supporting ring run suitably between two diametral abutment faces in massive portions between openings.

Further it is advantageous for the abutment surfaces to have larger axial dimensions than the collar halves of the supporting ring so that the supporting ring outside of the circular groove surrounds the smooth circumference of the collar on the end of the shaft stub and finds support there when, as is preferred, the inner radius of the support ring in this region corresponds to the radius of this collar.

To facilitate rotation for the opening and closing of the coupling and to permit the pulling off of rotatable portion of the bayonet coupling, at least one radial stop pin is provided in the region of the shaft stub correlated with the ring member and is associated with one of the passages of the rotatable portion of the bayonet coupling so that the rotation angle of the rotatable portion depending on the number of the provided corresponding passages and abutting surfaces is limited.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 2:
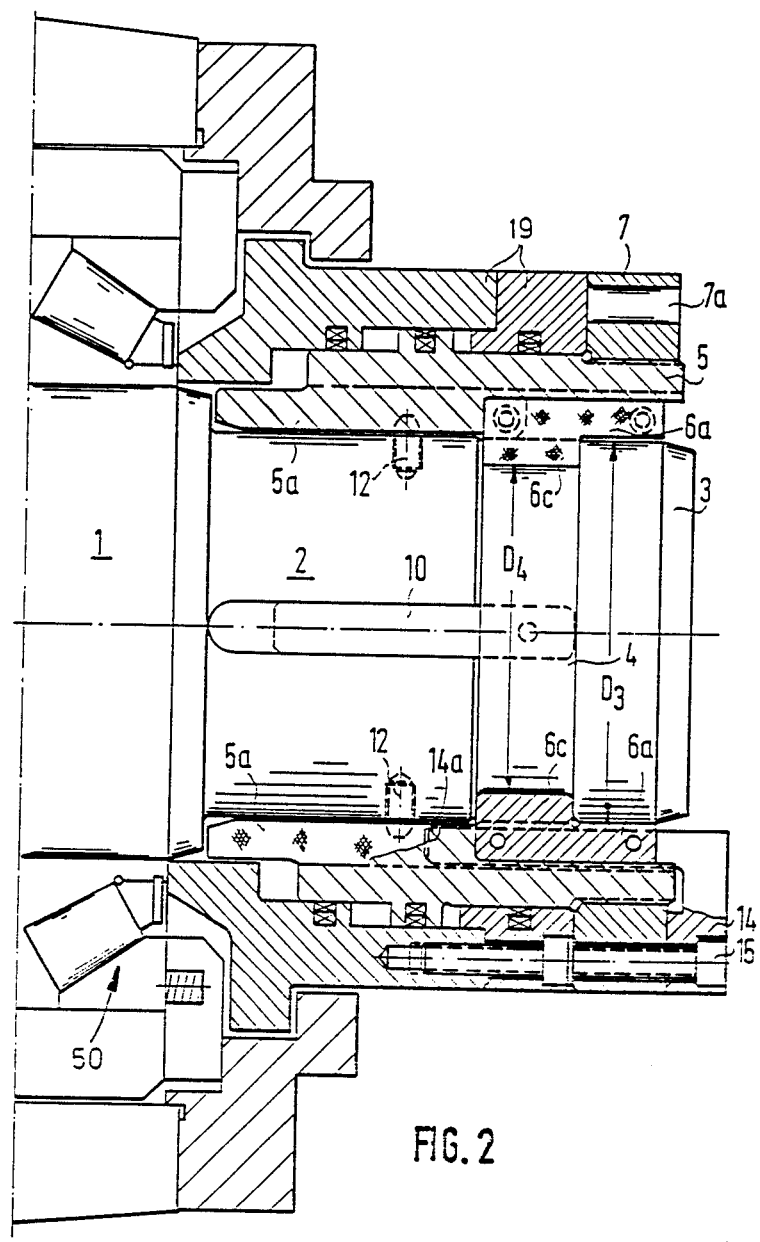
FIG. 2 is an axial cross sectional view taken along the section line II—II of FIG. 1.

As seen in FIG. 2, a roll 1 of a rolling mill stand whose details are not shown, but which has a bearing 50, has a circular groove 4 between the shaft stub 2 and the closed collar 3 onthe end of the shaft stub 2 which, in prior-art devices could receive a divided clamping ring for a roller bearing.

The inner cylinder 5 of a hydraulic bearing extractor (see the aforementioned patent) is associated with a ring piston 19. Without reworking or refinishing the closed collar 3 this inner cylinder 5 is axially fixed or clamped by a bayonet coupling on the shaft stub 2 according to the invention.

The inner cylinder or ring member 5 is usually provided with an external thread on which a retaining ring 7 is screwed. This retaining ring 7 is provided with a plurality of holes 7a distributed peripherally for engaging and inserting a hook or spinner wrench to tighten the retaining ring 7 against the ring piston 19. Individual details of the operation of the inner cylinder 5, the ring piston 19 and the retaining ring 7 and their cooperation are not provided in this description since this structure and its operation are known from the aforementioned patent.

Figure 1:
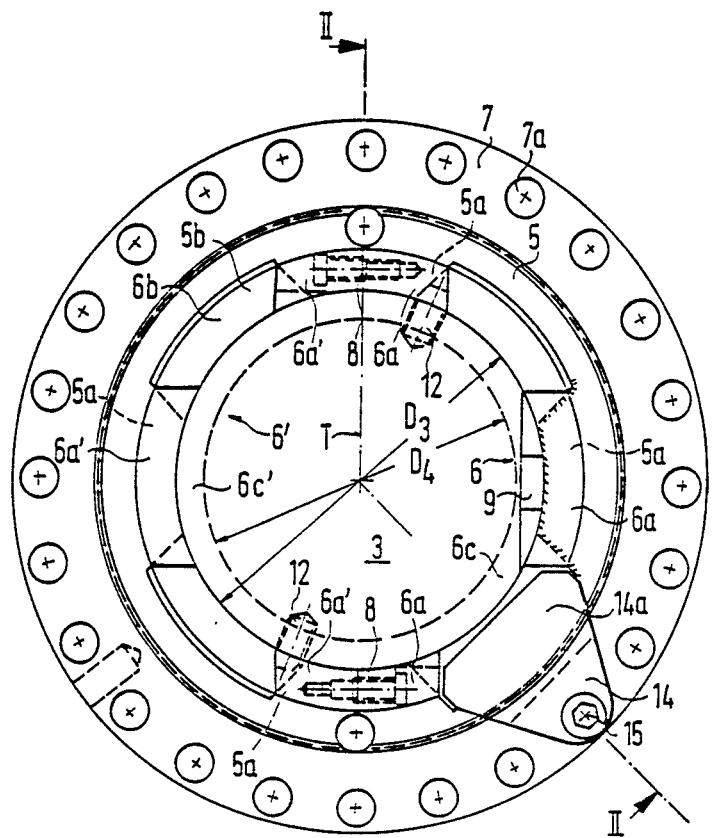
FIG. 1 is an elevational end view of a shaft stub with a bayonet coupling according to our invention in its locked position for rigidly attaching the inner cylinder of a hydraulic extractor for a roller bearing to the shaft stub.

The previously mentioned circular groove 4 of the shaft stub 2 is utilized to hold the supporting ring formed by semicircular elements 6, 6' of a bayonet coupling according to our invention. The elements 6 and 6' are, as seen in FIG. 1, two ring halves which are provided with radially projecting supporting surfaces 6a and 6a'.

The dividing plane T passes between diametral opposed abutment surfaces 6a and 6a' which are drawn into engagement with one another by fastening members 8, e.g. threaded screws or bolts, which join the ring halves 6 and 6' to form the closed supporting ring 6, 6' of the bayonet coupling axially anchored in the circular groove 4 of the shaft stub 2.

The inner semicircular collar halves 6c and 6c' form a complete annulus which engages in the circular groove 4 to fix the closed supporting ring 6, 6' axially.

In the upper half of FIG. 2, since the section line runs along the dividing plate T, a half supporting surface 6a with the inner half collar 6c of the supporting ring half 6 is shown in cross section, although the cross section line also runs through one of the passages 5b between the radially projecting supporting surfaces 6a and 6a'.

The part of the inner cylinder 5 to be fixed on the shaft stub 2 is a closed ring part with interiorly directed circumferentially divided abutting surfaces 5a of which one abutting surface is indicated by the cross hatching along the circumference. There is an opening 6b which corresponds to the passage 5b of the supporting ring halves 6 and 6' between these supporting surfaces 6a' and 6a.

The inner cylinder 5 can also be pushed axially until over the shaft stub 2 in a pivoted position in which those abutting surfaces 5a correspond with the openings 6b of the asssembled supporting rings 6 and 6' to bring about clamping in the locking configuration of the supporting elements 6, 6' by a rotation.

In the locked configuration the abutting surfaces 5a of the inner cylinder 5 are located behind the supporting surfaces 6a and 6a' of the assembled supporting ring halves 6 and 6' as shown in FIG. 1.

The inner collar half 6c of the supporting ring half 6 has a groove 9 (FIG. 1) in which a key 10 (FIG. 2) of the shaft engages over part of its length which extends over the width of the circular groove 4. The supporting ring 6, 6' is thus fixed nonrotatably on the shaft stub 2. The secure mounting of the supporting ring 6, 6' on the shaft stub 2 can be provided by another similar but different structure.

As seen from FIG. 2 the supporting surfaces 6a extend until over the outer circumferential surfaces of the collar 3 of the shaft stub 2 which has the outer diameter $D_3$. These supporting surfaces have a larger axial dimension than the collar halves 6c and 6c'.

Two radially extending diametrically opposed stop pins 12 are inserted on the region of the shaft stub 2 associated with the fixed inner cylinder 5 and have a definite positional relation with the passages 5b of the inner cylinder 5.

They are positioned within planes aligned with two diametrically opposed passages 5b so that the inner cylinder 5 can be pushed on the supporting ring 6, 6'. Without that on insertion the inner cylinder 5 would strike the stop pins 12. On the other hand these stop pins 12 are positioned so far from the edges of these aligned planes that they limit the rotation angle of the rotatable inner cylinder 5.

In the locking configuration of the bayonet coupling shown in FIG. 1 the rotation of the inner cylinder in the clockwise sense is limited by the stop pins 12 since they strike against a lateral surface of an abutting surface 5a of the inner cylinder 5. To unlock the bayoney coupling the inner cylinder 5 is rotated in the counterclockwise sense until the stop pins contact on the adjacent abutting surfaces 5a. In this way the rotation angle of the inner cylinder is limited so that the locking configuration and also the unlocking configuration of the inner cylinder 5 is defined.

To secure the locking configuration of the bayonet coupling shown in FIG. 1 a securing wedge 14 is inserted in two correspondingly aligned openings. The securing wedge 14 is held by a screw 15 passing through the retaining ring 7 to engage in the ring piston 19. The securing wedge 14 engages with a member 14a bent at an angle not only the divided supporting ring 6, 6' but also between neighboring abutting surfaces 5a of the inner cylinder 5.

The inner diameter of the supporting ring halves 6, 6' corresponds in the vicinity of the supporting surfaces 6a, 6a' to the outer diameter $D_3$ of the collar 3 of the shaft stub 2. The inner diameter of the circular groove halves 6c, 6c' corresponds to the outer diameter $D_4$ of the circular groove 4 of the shaft stub 2.

We claim:

1. In a shaft stub having a circular groove with a bayonet coupling for axially fixing a ring member on said shaft stub, particularly for fixing the inner cylinder of a hydraulic bearing extractor on said shaft stub, the improvement which comprises:

a support ring provided with a plurality of alternating angularly equispaced openings and supporting surfaces is formed by two supporting ring halves secured together by a plurality of fastening elements, said ring halves having inner collar halves which engage in said circular groove provided in said shaft stub; and means for fixing at least one of said ring halves nonrotatably to said shaft stub; and wherein said ring member is provided with a plurality of alternating angularly equispaced passages and abutting surfaces respectively interfittable with said opening and said supporting surfaces to form a rotatable portion of said bayonet coupling.

2. The improvement according to claim 1 wherein the dividing planes of said supporting ring when assembled run through two diametral juxtaposed abutting surfaces.

3. The improvement according to claim 2 wherein said abutting surfaces have a larger axial dimension than said inner collar halves.

4. The improvement according to claim 1 wherein at least one radial stop pin is provided in the vicinity of said shaft stub correlated with said ring member, said stop pin being associated with one of said passages in said rotatable part of said bayonet coupling so that the rotation angle of said rotatable portion of said bayonet coupling depending on the number of the provided corresponding passages and abutting surfaces is bounded.

5. The improvement according to claim 1 wherein said fixing means are screws.

6. A shaft stub having a circular groove with a bayonet coupling for axially fixing a ring member on said shaft stub, particularly for fixing the inner cylinder of a hydraulic extractor for roller bearings on said shaft stub comprising:

two supporting ring halves provided with a plurality of alternating circumferentially dividing openings and supporting surfaces attachable by a plurality of fastening elements, said two supporting ring halves having two inner collar halves which engage in said circular groove of said shaft stub so that at least one of said supporting ring halves is attached nonrotatably by being rotationally secured with said shaft stub and that said ring member provided with a plurality of alternating circumferentially dividing passages and abutting surfaces is the rotatable portion of said bayonet coupling; and at least one radial stop pin provided in the vicinity of said shaft stub associated with said ring member, said stop pin being associated with one of said passages in said rotatable part of said bayonet coupling so that the rotation angle of said rotatable portion of said bayonet coupling depending on the number of the provided corresponding ones of said passages and abutting surfaces is limited.

* * * * *